(12) United States Patent
Jan et al.

(10) Patent No.: US 6,516,675 B1
(45) Date of Patent: Feb. 11, 2003

(54) BUBBLE ULTRASONIC FLOW METER

(75) Inventors: Chin-Tsan Jan, Hsin-Chu (TW); Chen-Chia Chiu, Tainan (TW)

(73) Assignee: Taiwan Semiconductor Manufacturing Co., Ltd, hsin chu (TW)

( * ) Notice: Subject to any disclaimer, the term of this patent is extended or adjusted under 35 U.S.C. 154(b) by 0 days.

(21) Appl. No.: 10/053,180

(22) Filed: Jan. 15, 2002

(51) Int. Cl.$^7$ ................................................. G01F 1/44
(52) U.S. Cl. ................................................. 73/861.63
(58) Field of Search ...................... 73/861.63, 861.04, 73/200; 137/179

(56) References Cited

U.S. PATENT DOCUMENTS 3,867,955 A * 2/1975 Scott et al. ................ 137/179
5,390,547 A * 2/1995 Liu ............................. 73/200

* cited by examiner

Primary Examiner—Hezron Williams
Assistant Examiner—Jewel V Thompson
(74) Attorney, Agent, or Firm—Tung & Associates

(57) ABSTRACT

A method and apparatus for preventing flow rate errors derived from an ultrasonic flow meter utilized in semiconductor fabrication operations. The ultrasonic flow meter is generally configured to include an extension chamber connected to a thin branch tube of the ultrasonic flow meter. A venturi tube can be positioned at an outflow location of the ultrasonic flow meter, such that the thin branch tube is broached into the venturi tube, wherein bubbles contained in a slurry flow are forced directly into the outflow location to thereby prevent inaccurate flow measurements derived from the ultrasonic flow meter. The extension chamber may be configured to reduce an inflow velocity associated with the slurry slow and ensure that the bubbles with not drift with the slurry flow. Additionally, a diameter of the branch tube may be configured such that the diameter is much smaller than a diameter associated with an inflow and/or outflow tube of the ultrasonic flow meter.

20 Claims, 1 Drawing Sheet

BUBBLE ULTRASONIC FLOW METER

TECHNICAL FIELD

The present invention relates ultrasonic flow meter devices and methods thereof. The present invention also relates to ultrasonic flow meter devices utilized in semiconductor fabrication processes, including CMP (Chemical Mechanical Polishing) operations.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive fluids.

Ultrasonic flow meters are generally configured, such that a generated ultrasonic wave is caused to propagate through a fluid flowing through a tubular path of the ultrasonic flow meter. In typical ultrasonic flow meters, the velocity of the fluid flowing through the tubular path is determined on the basis of the difference between the rate of propagation of the ultrasonic wave that propagates from an upstream to a downstream and that, which propagates from the downstream to the upstream.

A typical prior art flow meter includes a conduit through which a fluid flows and a pair of ultrasonic transducers disposed in the conduit along a line, which is inclined by a predetermined angle with respect to a fluid flowing direction. In the operation, initially, an ultrasonic wave is emitted from the ultrasonic transducer disposed on the upstream side with respect to the flowing direction, toward the downstream side, and is received by the ultrasonic transducer on the downstream side. Then the propagation time from the emission to the reception of the ultrasonic wave is determined. Subsequently, an ultrasonic wave can be emitted from the ultrasonic transducer disposed on the downstream side with respect to the flowing direction, toward the upstream side, and is received by the ultrasonic transducer on the upstream side, and the propagation time from the emission to the reception of the ultrasonic wave is determined. Substituting the two propagation times into a well-known equation yields the velocity of the fluid, with which the rate of flow may be determined.

Ultrasonic flow meters are thus precision-sensitive devices utilized to measure flow rates. Such devices, however, have a number of disadvantages when applied to particular operations requiring precision measurements. These disadvantages are particularly noticeable in CMP (Chemical Mechanical Polishing) operations utilized in semiconductor device fabrication environments. One of the primary disadvantages of prior art ultrasonic flow meters in CMP operations involves the formation of bubbles within a slurry flow. In such scenarios, the ultrasonic wave in the flow is typically scattered by such bubbles, resulting in poor and inaccurate measurements. Thus, it is necessary to avoid bubbles passing through ultrasonic flow meters utilized in semiconductor device CMP operations in order to avoid influencing the flow rate.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide an improved ultrasonic flow meter and methods thereof.

It is therefore another aspect of the present invention to provide an improved ultrasonic flow meter method and methods thereof for use in semiconductor fabrication operations.

It is still another aspect of the present invention to provide an improved ultrasonic flow meter method and methods thereof for use in Chemical Mechanical Polishing (CMP) operations.

It is yet another aspect of the present invention to provide an improved ultrasonic flow meter method and methods thereof for limiting measurement errors derived from ultrasonic flow meters utilized in CMP operations.

The above and other aspects of the present invention can thus be achieved as is now described. A method and apparatus for preventing flow rate errors derived from an ultrasonic flow meter utilized in semiconductor fabrication operations are disclosed herein. The ultrasonic flow meter is generally configured to include an extension chamber connected to a thin branch tube of the ultrasonic flow meter. A venturi tube can be positioned at an outflow location of the ultrasonic flow meter, such that the thin branch tube is broached into the venturi tube, wherein bubbles contained in a slurry flow are forced directly into the outflow location to thereby prevent inaccurate flow measurements derived from the ultrasonic flow meter. The extension chamber may be configured to reduce an inflow velocity associated with the slurry slow and ensure that the bubbles with not drift with the slurry flow.

Additionally, a diameter of the branch tube may be configured such that the diameter is much smaller than a diameter associated with an inflow and/or outflow tube of the ultrasonic flow meter. A first terminal of the thin branch tube may be connected to the venturi tube to establish an outflow tube. Additionally, the ultrasonic flow meter may be configured such that a differential pressure exists form the extension chamber toward an outflow tube of the ultrasonic flow meter. The slurry flows into an outlet tube of the ultrasonic flow meter and does not pass through the ultrasonic flow meter. Such an ultrasonic flow meter may be adapted for use in Chemical Mechanical Polishing (CMP) operations. The bubbles may comprise a plurality of minibubbles.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
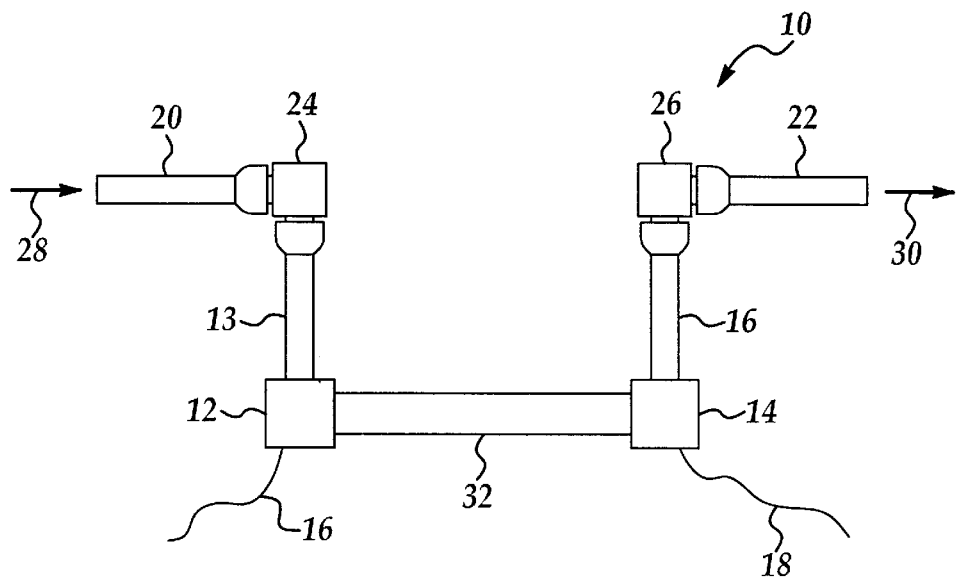
FIG. 1 illustrates a prior ultrasonic flow meter device.

FIG. 1 illustrates a prior ultrasonic flow meter device 10, which includes ultrasonic wave emitter/receiver 12 and 14. Ultrasonic wave emitter/receiver 12 is connected to a tube 13, which in turn is connected to an interface portion 24. The interface portion 24 is connected to a tube 20 through which inflow 28 enters. An ultrasonic flow meter is located between ultrasonic wave emitter receiver 12 and 14, which in turn are respectively connected to signal cables 16 and 18. Ultrasonic wave emitter/receiver 14 is connected to a tube 15, which in turn is connected to an interface portion 26. The interface portion 26 is connected to a tube 22 through which an outflow 30 exits.

The configuration depicted in FIG. 1 suffers from several inherent problems. First, the ultrasonic wave in the flow will be scattered by bubbles, resulting in error prone measurements. Additionally, even a small amount of bubbles contained in the viscosity of the slurry is not easy to be removed in a small diameter tube. Thus, one of the primary disadvantages of prior art ultrasonic flow meters in CMP operations, for example, involves the formation of bubbles within a slurry flow. In such scenarios, the ultrasonic wave in the flow is typically scattered by such bubbles, resulting in poor and inaccurate measurements. It is thus necessary to avoid bubbles passing through ultrasonic flow meters utilized in semiconductor device CMP operations in order to avoid influencing the flow rate.

Figure 2:
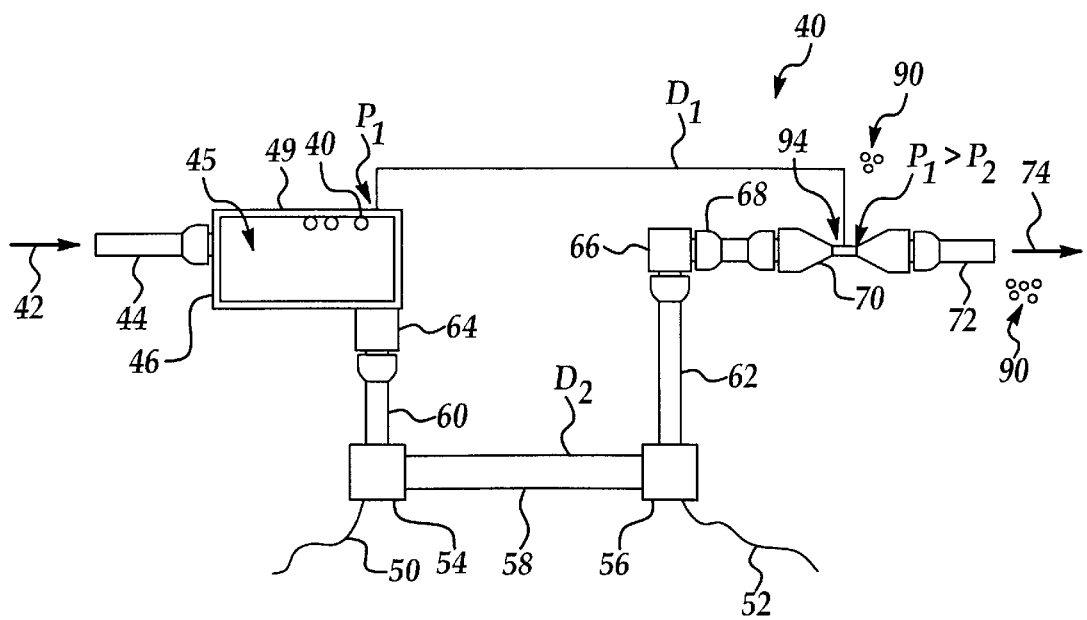
FIG. 2 depicts an ultrasonic flow meter device, in accordance with a preferred embodiment of the present invention.

FIG. 2 depicts an ultrasonic flow meter device 40, in accordance with a preferred embodiment of the present invention. Ultrasonic flow meter device 40 includes a tube 44 through which inflow 42 may enter. Tube 44 is connected to an extension chamber 46 in which a slurry 45 may be collected. Bubbles 90 are depicted within slurry 45. It is desirable to prevent such bubbles from passing from the extension chamber 46 and into interface portion 64 and tube 60 because tube 60 is connected not only to interface portion 64 but also to wave emitter/receiver 54. Wave emitter/receiver 54 is connected to a signal cable 50, while wave emitter/receiver 56 is connected to a signal cable 52. The wave emitter/receiver 54 is additionally connected to a tube 62, which in turn is connected to an interface portion 66.

The interface portion 66 is connected to a tube 68, which in turn is connected to a tube 70 that may be configured as a venturi tube. A thin branch tube 80 connects tube 70 to extension chamber 46. Note that the extension chamber 46 contains a pressure $P_1$, while tube 70 contains a pressure $P_2$ that is greater than $P_1$. Tube 70 is also connected to a tube 72 through which outflow 74 and bubbles may exist. Note also that the thin branch tube 80 contains a diameter $D_1$ that is much less than a diameter $D_2$ of ultrasonic flow meter 58.

Extension chamber 46 reduces the inflow 42 velocity of slurry 45 and ensure that bubbles 90 (i.e., mini-bubbles) will not drift with the slurry flow. The bubbles 90 in extension chamber 46 will thus drift toward and into thin branch tube 80 because the roof 49 of extension chamber 46 is shaped generally like an overturned funnel. The other terminal 94 of thin branch tube 80 is connected to tube 70 (i.e., a venturi tube), which can be established at the tube 72. Note that tube 72 comprises an outflow tube. The diameter diameter $D_1$ of thin branch tube 80 is much smaller than the diameter of either tube 46, which comprises an inflow tube, or tube 72, which comprises an outflow tube. A pressure differential also exists from extension chamber 46 toward outflow tube 72, thereby forcing bubbles 90 away from ultrasonic flow meter 58. In fact, little slurry will flow into outflow tube 72 and does not pass through ultrasonic flow meter 58. This results in very little measurement errors and is acceptable because the slurry flow false alarm percentage in CMP (e.g., Mirra CMP) is generally about 30%.

A number of advantages can be obtained from implementing the improved ultrasonic flow meter of the present invention. For example, bypass bubble in the flow is successive and self-working. An additional power or valve is not necessary. Also, less time is required to calibrating the flow meter, while reducing wasted slurry. Additionally, false alarms can be reduced regarding slurry flow during CMP operations. Finally, the present invention is easy to install and when implemented properly, is practically maintenance free.

Based on the foregoing it can be appreciated that the present invention discloses a method and apparatus for preventing flow rate errors derived from an ultrasonic flow meter utilized in semiconductor fabrication operations. The ultrasonic flow meter is generally configured to include an extension chamber connected to a thin branch tube of the ultrasonic flow meter. A venturi tube can be positioned at an outflow location of the ultrasonic flow meter, such that the thin branch tube is broached into the venturi tube, wherein bubbles contained in a slurry flow are forced directly into the outflow location to thereby prevent inaccurate flow measurements derived from the ultrasonic flow meter. The extension chamber may be configured to reduce an inflow velocity associated with the slurry slow and ensure that the bubbles with not drift with the slurry flow.

Additionally, a diameter of the branch tube may be configured such that the diameter is much smaller than a diameter associated with an inflow and/or outflow tube of the ultrasonic flow meter. A first terminal of the thin branch tube may be connected to the venturi tube to establish an outflow tube. Additionally, the ultrasonic flow meter may be configured such that a differential pressure exists form the extension chamber toward an outflow tube of the ultrasonic flow meter. The slurry flows into an outlet tube of the ultrasonic flow meter and does not pass through the ultrasonic flow meter. Such an ultrasonic flow meter may be adapted for use in Chemical Mechanical Polishing (CMP) operations. The bubbles may comprise a plurality of minibubbles.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is thus not intended to be exhaustive or to limit the scope of the invention. Many modifications and variations are possible in light of the above teaching without departing from scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for preventing flow rate errors derived from an ultrasonic flow meter utilized in semiconductor fabrication operations, said method comprising the step of:

configuring said ultrasonic flow meter to include an extension chamber connected to a thin branch tube of said ultrasonic flow meter;

positioning a venturi tube at an outflow location of said ultrasonic flow meter, such that said thin branch tube is broached into said venturi tube, wherein bubbles contained in a slurry flow are forced directly into said outflow location to thereby prevent inaccurate flow measurements derived from said ultrasonic flow meter.

2. The method of claim 1 further comprising the step of:
configuring said extension chamber to reduce an inflow velocity associated with said slurry slow and ensure that said bubbles with not drift with said slurry flow.

3. The method of claim 1 further comprising the step of:
configuring a diameter of said thin branch tube such that said diameter is much smaller than a diameter associated with an inflow tube of said ultrasonic flow meter.

4. The method of claim 1 further comprising the step of:
configuring a diameter of said thin branch tube such that said diameter is much smaller than a diameter associated with an outflow tube of said ultrasonic flow meter.

5. The method of claim 1 further comprising the step of:
connecting a first terminal of said thin branch tube to said venturi tube to establish an outflow tube.

6. The method of claim 1 further comprising the step of:
configuring said ultrasonic flow meter such that a differential pressure exists form said extension chamber toward an outflow tube of said ultrasonic flow meter.

7. The method of claim 1 further comprising the step of:
configuring said ultrasonic flow meter such that said slurry flows into an outlet tube of said ultrasonic flow meter and does not pass through said ultrasonic flow meter.

8. The method of claim 1 wherein said ultrasonic flow meter is adapted for use in Chemical Mechanical Polishing (CMP) operations.

9. The method of claim 1 wherein said bubbles comprise a plurality of mini-bubbles.

10. A method for preventing flow rate errors derived from an ultrasonic flow meter utilized in semiconductor fabrication operations, said method comprising the step of:
configuring said ultrasonic flow meter to include an extension chamber connected to a thin branch tube of said ultrasonic flow meter;
positioning a venturi tube at an outflow location of said ultrasonic flow meter, such that said thin branch tube is broached into said venturi tube, wherein bubbles contained in a slurry flow are forced directly into said outflow location to thereby prevent inaccurate flow measurements derived from said ultrasonic flow meter; and
configuring said extension chamber to reduce an inflow velocity associated with said slurry slow and ensure that said bubbles with not drift with said slurry flow.

11. An ultrasonic flow meter utilized in semiconductor fabrication operations, said ultrasonic flow meter comprising:
an extension chamber connected to a thin branch tube of said ultrasonic flow meter; and
a venturi tube positioned at an outflow location of said ultrasonic flow meter, such that said thin branch tube is broached into said venturi tube, wherein bubbles contained in a slurry flow are forced directly into said outflow location to thereby prevent inaccurate flow measurements derived from said ultrasonic flow meter.

12. The ultrasonic flow meter of claim 11 wherein said extension chamber is configured to reduce an inflow velocity associated with said slurry slow and ensure that said bubbles with not drift with said slurry flow.

13. The ultrasonic flow meter of claim 11 wherein a diameter of said thin branch tube is much smaller than a diameter associated with an inflow tube of said ultrasonic flow meter.

14. The ultrasonic flow meter of claim 11 wherein diameter of said thin branch tube is much smaller than a diameter associated with an outflow tube of said ultrasonic flow meter.

15. The ultrasonic flow meter of claim 11 wherein a first terminal of said thin branch tube is connected to said venturi tube to establish an outflow tube.

16. The ultrasonic flow meter of claim 11 wherein said ultrasonic flow meter is configured such that a differential pressure exists form said extension chamber toward an outflow tube of said ultrasonic flow meter.

17. The ultrasonic flow meter of claim 11 wherein ultrasonic flow meter is configured such that said slurry flows into an outlet tube of said ultrasonic flow meter and does not pass through said ultrasonic flow meter.

18. The ultrasonic flow meter of claim 11 wherein said ultrasonic flow meter is adapted for use in Chemical Mechanical Polishing (CMP) operations.

19. The ultrasonic flow meter of claim 11 wherein said bubbles comprise a plurality of mini-bubbles.

20. An ultrasonic flow meter utilized in semiconductor fabrication operations, said ultrasonic flow meter comprising:
an extension chamber connected to a thin branch tube of said ultrasonic flow meter;
a venturi tube positioned at an outflow location of said ultrasonic flow meter, such that said thin branch tube is broached into said venturi tube, wherein bubbles contained in a slurry flow are forced directly into said outflow location to thereby prevent inaccurate flow measurements derived from said ultrasonic flow meter; and
said extension chamber configured to reduce an inflow velocity associated with said slurry slow and ensure that said bubbles with not drift with said slurry flow.

* * * * *